United States Patent
Zinke et al.

(10) Patent No.: US 8,082,371 B2
(45) Date of Patent: Dec. 20, 2011

(54) METHOD AND CIRCUIT ARRANGEMENT FOR THE MONITORING AND MANAGEMENT OF DATA TRAFFIC IN A COMMUNICATION SYSTEM WITH SEVERAL COMMUNICATION NODES

(75) Inventors: Manfred Zinke, Aachen (DE); Patrick Willem Hubert Heuts, Malden (NL); Peter Fuhrmann, Aachen (DE)

(73) Assignee: NXP B.V., Eindhoven (NL)

( * ) Notice: Subject to any disclaimer, the term of this patent is extended or adjusted under 35 U.S.C. 154(b) by 1837 days.

(21) Appl. No.: 10/505,187

(22) PCT Filed: Feb. 13, 2003

(86) PCT No.: PCT/IB03/00467
§ 371 (c)(1),
(2), (4) Date: Aug. 18, 2004

(87) PCT Pub. No.: WO03/069843
PCT Pub. Date: Aug. 21, 2003

(65) Prior Publication Data
US 2005/0094674 A1 May 5, 2005

(30) Foreign Application Priority Data
Feb. 18, 2002 (DE) .................................. 102 06 875

(51) Int. Cl.
*G06F 3/00* (2006.01)
*H04J 3/06* (2006.01)
(52) U.S. Cl. ............ 710/18; 710/33; 370/501; 370/503; 370/507
(58) Field of Classification Search .................... 710/18, 710/33; 714/2, 4, 43, 56, 700; 370/503, 370/501, 507
See application file for complete search history.

(56) References Cited

U.S. PATENT DOCUMENTS 6,246,702 B1 * 6/2001 Fellman et al. ................ 370/503
7,035,246 B2 * 4/2006 Taylor ............................ 370/350
(Continued)

FOREIGN PATENT DOCUMENTS
WO 00/65457 A2 2/2000
(Continued)

OTHER PUBLICATIONS

Kopetz et al. "Tolerating Arbitrary Node Failures in the Time-Triggered Architecture." SAE 2001 World Congress, Mar. 2001, Detroit, MI.*
(Continued)

*Primary Examiner* — Tammara Peyton (57) ABSTRACT

The invention describes a method for the monitoring and management of data traffic in a communication system with several communication nodes which communicate via interfaces monitored by a bus monitor, comprising the following steps: a) provision of a predefined communication time schedule for all communication nodes, b) initialization of the bus monitor, c) synchronization of the communication time schedule of the bus monitor with the predefined communication time schedule executed by the communication nodes in a distributed arrangement, the synchronization taking place on the basis of activities observed at the interfaces, d) monitoring of the activities of the communication nodes by the bus monitor, e) comparison of the activities with the predefined communication time schedule, and f) deactivation of the interface for any communication node for which an activity not compatible with the predefined communication time schedule has been detected. A circuit arrangement and its use are also described.

11 Claims, 5 Drawing Sheets

U.S. PATENT DOCUMENTS

| | | | |
|---|---|---|---|
| 7,103,805 B2 * | 9/2006 | Belschner et al. | 714/43 |
| 7,124,316 B2 * | 10/2006 | Kopetz et al. | 714/2 |
| 7,362,834 B2 * | 4/2008 | Fuehrer et al. | 375/354 |

FOREIGN PATENT DOCUMENTS

| | | |
|---|---|---|
| WO | WO 01 13230 | 2/2001 |
| WO | 03/069843 A2 | 8/2003 |

OTHER PUBLICATIONS

Steiner et al. "The Transition from Asynchronous to Synchronous system Operation: An Approach for Distributed Fault-Tolerant Systems (Including Simulation)." Institut Technische Informatik, Vienna, Austria. 2001.*

Temple. "Avoiding the Babbling-Idiot Failure in a Time-Triggered Communication System." 28th International Symposium on FTCS, Jun. 1998, Munchen, Germany.*

Bauer et al. "A Centralized Approach for Avoiding the Babbling-Idiot Failure in the Time-Triggered Architecture." ICDSN, New York, NY, USA, Jun. 2000.*

Kopetz, H. et al. "A Synchronization Strategy for a Time-Triggered Multicluster Real-Time System," IEEE Proc. of the 14th Symp. on Reliable Distributed Systems, pp. 154-161 (1995).

Poledna, S. et al. "TTP: 'Drive by Wire' in Greiferbarer Naehe," Elektronik, 8 pgs. (1999), with machine English translation.

Poledna, "TTP/C—Fault-Tolerant Real-Time Communication with Integrated High-Level Services", Time Triggered Technology, 11 pgs. (Jan. 24, 2000).

Berwanger, J. et al. "FlexRay—The Communication System for Advanced Automotive Control Systems," SAE 2001 World Congress, SAE Technical Paper Series, No. 2001-01-0676, 14 pgs. (Mar. 2001).

* cited by examiner

METHOD AND CIRCUIT ARRANGEMENT FOR THE MONITORING AND MANAGEMENT OF DATA TRAFFIC IN A COMMUNICATION SYSTEM WITH SEVERAL COMMUNICATION NODES

The invention concerns a method and a circuit arrangement for the monitoring and management of data traffic in a communication system with several communication nodes, with which it is possible to operate communication systems with autonomous media access control.

Timed communication protocols are proposed for distributed real-time computer systems, as used in, for example, the automobile industry. Communication programs of this kind are described in, for example, S. Polenda, G. Kroiss "TTP: 'Drive by Wire' in greifbarer Nähe" Elektronik, No. 14, 1999, p.p. 36 to 43, and J. Berwanger et al "FlexRay—The Communication System for Advanced Automotive Control Systems", SAE World Congress 2001. In these systems, the media access protocol is based on a time-division multiplex method such as TDMA (Time Division Multiple Access) with a static communication time schedule which is defined in advance during system design. This schedule defines for each communication node the times at which it may transmit data within a communication cycle. In timed communication protocols of this kind it may happen, without further protective measures being taken, that a single defective node, also known as a "babbling idiot", which is constantly transmitting also outside the allocated time slots blocks the entire data traffic.

In order to prevent this, access to the transmission medium is generally protected by a bus monitor for the said protocols, as described in, for example, C. Temple "Avoiding the Babbling-Idiot Failure in a Time-Triggered Communication System" at the 28$^{th}$ Annual International Symposium on Fault-Tolerant Computing, Munich, Germany, in June 1998. The bus monitor has an independent time basis and is equipped with a scheduler, which allows write access to the medium only during the time slots reserved for a communication node and during short tolerance areas before and after these time slots. If the bus monitor establishes that a communication node is attempting to write to the data bus outside the time period reserved for it, it stops this access, reports an error state and permanently blocks further bus access by this communication node. The bus monitor thus ensures the fail-silent property of a communication node.

In principle, each of the communication nodes in the distributed arrangement can be equipped with its own bus monitor but, in the case of star networks, solutions with a central bus monitor are also possible; this central bus monitor monitors the communication of all nodes connected to a star coupler. A detailed description of a central bus monitor of this kind can be found in WO 01/13230 A1, for example.

The communication controllers located in the communication nodes in the distributed arrangement and the bus monitor (s) should operate as independently of one another as possible, but their communication time schedules have to be synchronized at least once during initialization. Normally, this synchronization is additionally repeated at regular intervals, for example, once at the start of each communication cycle. In the case of solutions with bus monitors in a decentralized arrangement in the communication nodes, such synchronization can easily be achieved with the aid of suitable control signals from the communication controllers. To synchronize the communication controllers in a distributed arrangement with one another, algorithms for global clock synchronization are generally used. Using a suitable design of the interface between the bus monitor and the communication controller, bus monitors in a decentralized arrangement can also follow the corrections for global clock synchronization.

In the case of star networks with active network couplers, hereinafter designated active star couplers, the communication nodes are usually connected to a star coupler via point-to-point connections. The data transmitted by a communication node is passed on to all other communication nodes with the aid of the distribution unit in the star coupler. Apart from the data lines, central bus monitors should require no additional connections to the communication controllers to be monitored. The synchronization of the bus monitor with the connected communication controllers, therefore, has to take place in a manner other than that in the case of bus monitors in a decentralized arrangement. One option that suggests itself is the integration of the central bus monitor with an allocated communication controller. This communication controller can actively synchronize itself with the other communication controllers in the network, and also transmit data, for example status information, via predefined time slots. Owing to the spatial proximity, it is possible to synchronize the central bus monitor with the communication time schedule of this communication controller with the aid of suitable control lines. A disadvantage of this method is the great dependence on the correct functioning of this communication controller.

It is an object of the invention to provide a method of the type specified above, in which a central bus monitor is synchronized with the time-division multiplex schematic and the global clock time of the communication nodes in a distributed arrangement. A circuit arrangement with which the method according to the invention can be realized will also be specified.

This object is achieved by a method as claimed in claim 1 and a circuit arrangement as claimed in claim 7. Advantageous embodiments of the method according to the invention and the circuit arrangement according to the invention are the subject matter of the related dependent claims.

The method according to the invention for monitoring and managing data traffic in a communication system with several communication nodes which communicate via interfaces, monitored by a bus monitor, comprises the following steps:

a) provision of a predefined communication time schedule for all communication nodes, b) initialization of the bus monitor, c) synchronization of the bus monitor's communication time schedule with the predefined communication time schedule executed by the communication nodes in a distributed arrangement, the synchronization taking place on the basis of activities observed at the interfaces, d) monitoring of the activities of the communication nodes by the bus monitor, e) comparison of the activities with the predefined communication time schedule, and f) deactivation of the interface for a communication node for which an activity not compatible with the predefined communication time schedule has been detected.

The bus monitor monitors activities at all star interfaces and, with its own communication schematic, controls the access of all communication nodes to the distribution unit.

"Activities" should be understood herein as the state transitions from "inactive" to "active" and from "active" to "inactive". Observation of these state transitions or activities gives rise to the monitoring of the communication time schedule of the communication nodes, and the comparison with the predefined communication time schedule of the bus monitor, as well as the synchronization of the predefined communication time schedule for the central bus monitor with the communication time schedule of the communication nodes in a distributed arrangement. Since, as opposed to known solutions, decoding of the received data packets is not necessary, the method according to the invention can be used for communication systems with the most diverse coding methods.

The bus monitor can jointly monitor the communication time schedule for all connected communication nodes. In addition, or as an alternative, the activities observed at a particular interface can be specifically compared with the communication time schedule for the communication node connected to this interface. In this manner, the incorrected behavior of a communication node, which, for example, is transmitting data in all time slots, can be recognized even before the synchronization of the bus monitor is completed. Depending on the requirements of the planned use, the associated interface could then be deactivated at an early stage, which could even prevent a disturbance of the system start-up. This property is particularly important in communication systems in which the protective function of the bus monitor has to remain deactivated after switch-on until the communication time schedules of the bus monitor and the communication nodes or their communication controllers have been synchronized.

In the initialization phase, the activities of the communication controllers will, in some circumstances, not yet comply with the predefined communication time schedule. Discrepancies can occur as a result of, for example, individual communication controllers integrating into the network only after a delay, or media access conflicts having to be resolved. During this period, the bus monitor allows sustained write access by the communication controllers and restricts itself to the observation of the activities. The activities observed are continuously compared with a synchronization pattern which is part of the communication time schedule for the bus monitor.

If a central bus monitor according to the invention is used to monitor the activities, no additional communication controller is necessary for its control, so one possible error source is dispensed with.

Various methods may be used for the synchronization of the communication time schedule in the central bus monitor. If, for example, special symbols or data packets of differing lengths, such as SOC (Start Of Cycle) frames, are used to identify the start of a communication cycle when the communication time schedule is defined, these data packets can be easily recognized and used for synchronization. Special data packets of this kind do not necessarily have to be located at the start of a communication cycle, but clear allocation to a known instant within the communication cycle must be possible. A further option is the use of a predefined sequence of data packets for identifying a known instant within the communication cycle.

In addition, a continuous synchronization of the bus monitor with the global clock time of the communication system in line with the understanding of the communication controllers in a distributed arrangement is necessary.

The state transitions "inactive" to "active" or "active" to "inactive" recognized by the activity detectors at the star interfaces are also used for this clock synchronization of the bus monitor. In most time-controlled communication protocols, the instant for the start of a data packet is suitable as the reference for the clock synchronization. This instant can be recognized by the bus monitor as a state transition from "inactive" to "active". Following synchronization of the communication time schedule, the bus monitor can pre-calculate, with the aid of its local clock, the instants at which the state transitions for identification of the start of a data packet are expected. In addition, it can define expectation windows which define areas around the expectation instants within which a state transition is regarded as a permitted starting instant of a data packet.

For each data packet received, the bus monitor determines the discrepancy between the expected and the actually observed state transition. This discrepancy is determined independently for each communication node connected, and used for correcting the local time of the bus monitor. In the simplest case, this correction can take place in such a way that, on arrival of each data packet within the calculated expectation window, the local time is matched to the instant observed. However, one disadvantage of this method consists in the fact that a communication node with a defective local clock would directly influence the local time of the bus monitor. If the measured discrepancies of the starting instants of data packets of multiple communication nodes are included in the correction, an error-tolerant correction of the local time of the bus monitor can then be achieved. Known algorithms can then be used for global clock synchronization.

Synchronization of the communication controllers with one another usually takes place with the aid of known methods for global clock synchronization, as described in, for example, H. Kopetz et al "A synchronization strategy for a time-triggered multicluster real-time system", Proceedings, 14$^{th}$ Symposium on Reliable Distributed Systems, Bad Neuenahr, Germany, 13 to 15 Sep. 1995.

After initialization, a central bus monitor must remain deactivated, thereby permitting the unprotected transmission of all data packets sent, until its communication time schedule is synchronized with the communication time schedule of the communication nodes in a distributed arrangement. Only when synchronization has taken place does the bus monitor start to pass on data packets from one transmitting communication node to the other nodes, e.g. via a distribution unit, only according to the predefined communication time schedule.

The invention also describes a circuit arrangement for monitoring and managing the data traffic in a communication system with several communication nodes which communicate with one another via interfaces, which circuit arrangement includes:
 at least one active star coupler with connected communication nodes, there being provided a predefined communication time schedule for all communication nodes, and
 a central bus monitor which is connected to the active star coupler, after initialization of the bus monitor the communication time schedule of the bus monitor being synchronized with the predefined communication time schedule executed by the communication nodes in a distributed arrangement, which synchronization takes place on the basis of activities observed at the interfaces, which bus monitor monitors the activities of the communication nodes, compares the activities with the predefined communication time schedule, and deactivates the interface for a node for which an activity not compatible with the predefined communication time schedule has been detected.

Each interface is preferably equipped with at least one activity detector. If the interfaces for directional control in the star coupler are equipped with activity detectors anyway, advantage can then be taken of this fact.

A distribution unit which passes on the signals received from a communication node to the other communication nodes may be provided, but is not absolutely essential.

It may also be made arranged to make available an activity detector for the bus monitor, which monitors the activities of the star point in the active star coupler. Only the information concerning the instant of a change of state will then be available here. However, the bus monitor cannot recognize the allocation of an activity to an interface. This embodiment has the advantage that it can also be realized with bus drivers which do not make any activity signal available.

In the case of star networks with active star couplers, the bus monitor may be advantageously combined with the active star coupler to form one unit. The costs and space requirement of an active star coupler with an integrated bus monitor of this kind can be reduced through the use of the method according to the invention.

When at least one circuit arrangement according to the present invention is used, the bus monitor allows access of the connected communication nodes to, for example, the distribution unit of the active star coupler only in accordance with its own communication time schedule. If several circuit arrangements are used in a time-controlled communication system with active multiple star topology, this also includes the communication between active star couplers. Fields of application can be found, for in the automobile and aeronautical industries.

The invention will be further described with reference to embodiments as shown in the drawings, to which, however, the invention is not restricted.

Figure 1:
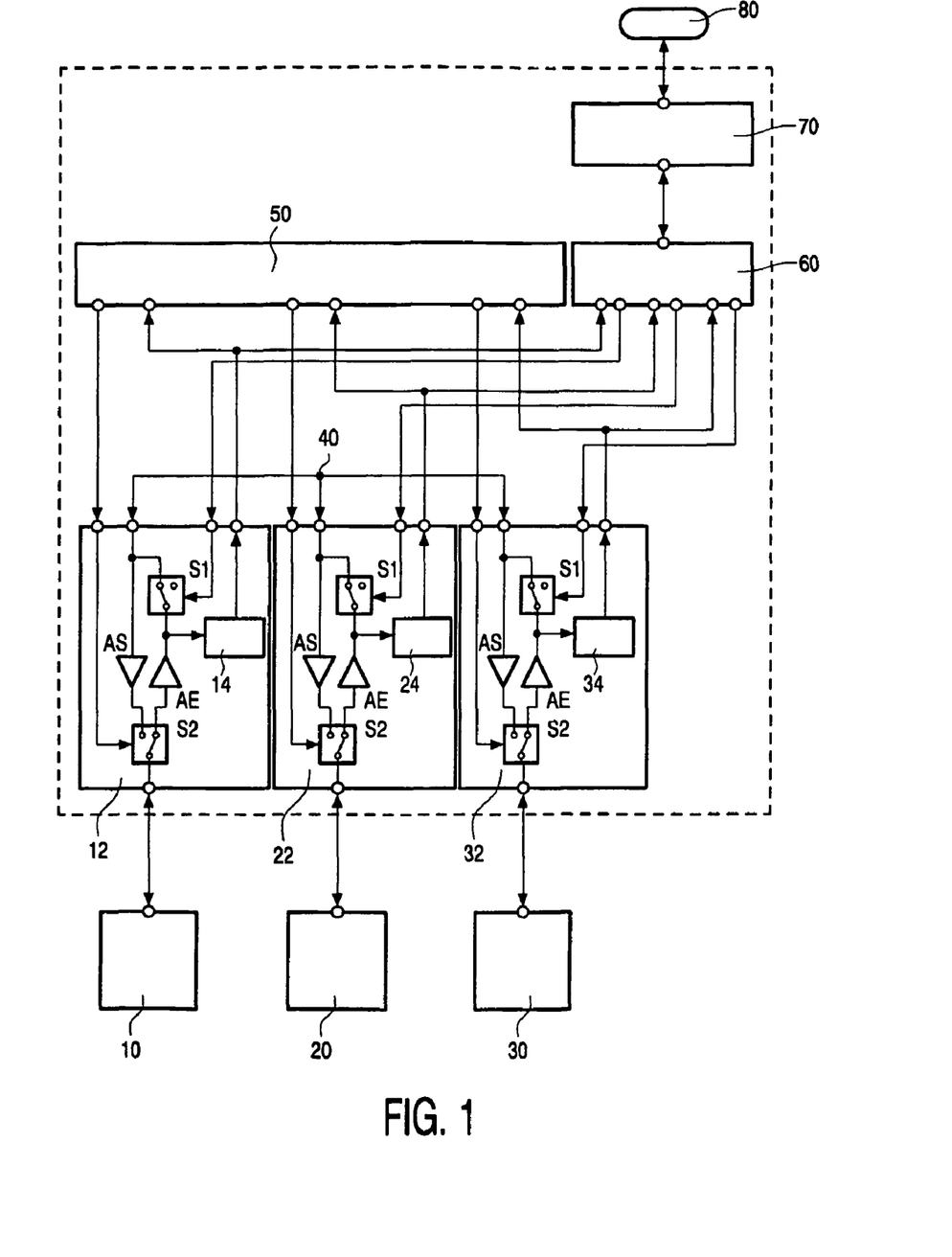
FIG. 1 shows a diagram of an embodiment of an active star coupler with a bus monitor according to the present invention.

FIG. 1 shows an embodiment of an active star coupler with communication nodes 10, 20, 30 which lead, via allocated bi-directional bus drivers 12, 22, 32, to a star point 40 and are connected to a distribution unit 50, which distributes received data. Each bus driver 12, 22, 32 consists of a transmitting path and a receiving path which are realized in the usual manner by means of amplifiers AS and AE. The distribution unit 50 may be executed, for example, in digital form as a "finite state machine". Connected to the bus drivers 12, 22, 32 and the distribution unit 50 is a bus monitor 60 whereto a host controller 70 is connected for the control and configuration of the bus monitor 60. Each of the bus drivers 12, 22, 32 is equipped with an activity detector 14, 24, 34, which is connected in the receiving path of the relevant bus driver 12, 22, 32 in such a way that it can recognize activities on the receiving path and report them to the bus monitor 60. In the basic state shown, all bus drivers 12, 22, 32 operate as receivers and the bus monitor 60 allows sustained write access by the communication nodes. If data from the connected communication node 10, 20 or 30, for example, from the node 30, now arrives at one of the interfaces, the associated activity detector 34 reports this to the distribution unit 50. This unit then controls the switch S2 in the other bus drivers 10, 20, so that they are switched to transmit. This enables the distribution of the received data to the communication nodes 10, 20. The distribution unit 50 can recognize media access conflicts in activities reported from multiple interfaces simultaneously, and can resolve them by, for example, priority control. This basic function of the active star coupler is supplemented by the bus monitor 60 to the effect that it evaluates the activity signals from the individual bus drivers and, with the aid of the switch S1, can permit or deny, via control lines, write access by the connected communication nodes.

Figure 2:
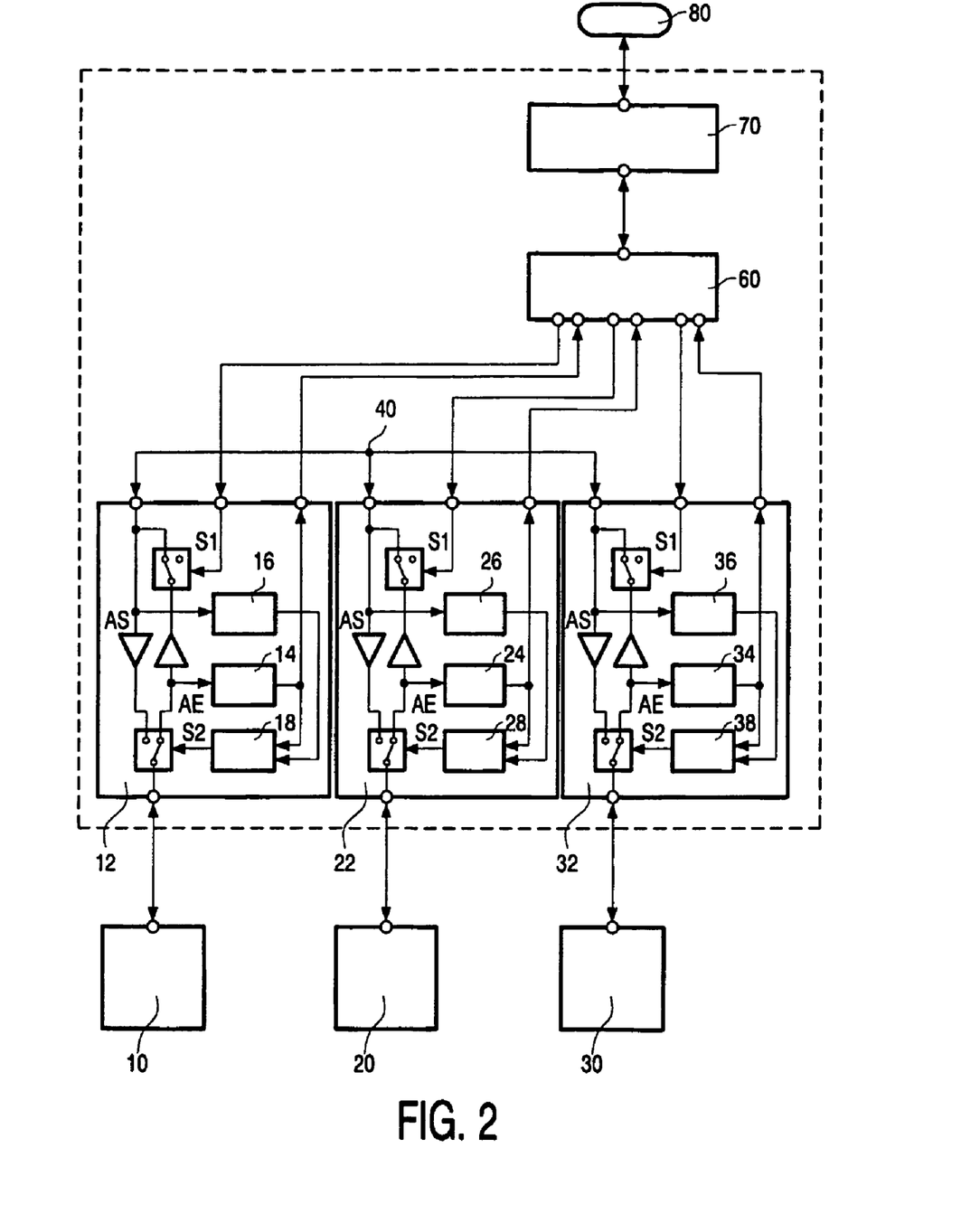
FIG. 2 shows a diagram of an embodiment similar to FIG. 1, but without a distribution unit.

FIG. 2 shows an alternative embodiment which is not equipped with a distribution unit. Each bus driver 12, 22, 32 is provided with an activity detector 14, 24, 34 for the received signal, and an activity detector 16, 26, 36 for the transmitted signal. In the switch position shown, for a received data packet, activity at one interface is first detected by the activity detector 14 and, after a short delay, also by the activity detector 16. In the case of a signal transmitted from the star point to the interface, activity is detected only by the activity detector 16. From the states and the variation of the two activity signals in time, a control unit, which is designated in the diagram with 18 and 28, 38, derives the control signal for the change of direction by the switch S2. A control of this kind is known from the patent application . . . (ID 605940 "Active star without data loss") which has not yet been laid open. As in the embodiment shown in FIG. 1, the bus monitor 60 receives independent activity signals from all bus drivers 12, 22, 32, and controls write access by the communication nodes 10, 20, 30 through each time the switch S1 in the bus drivers.

Figure 3:
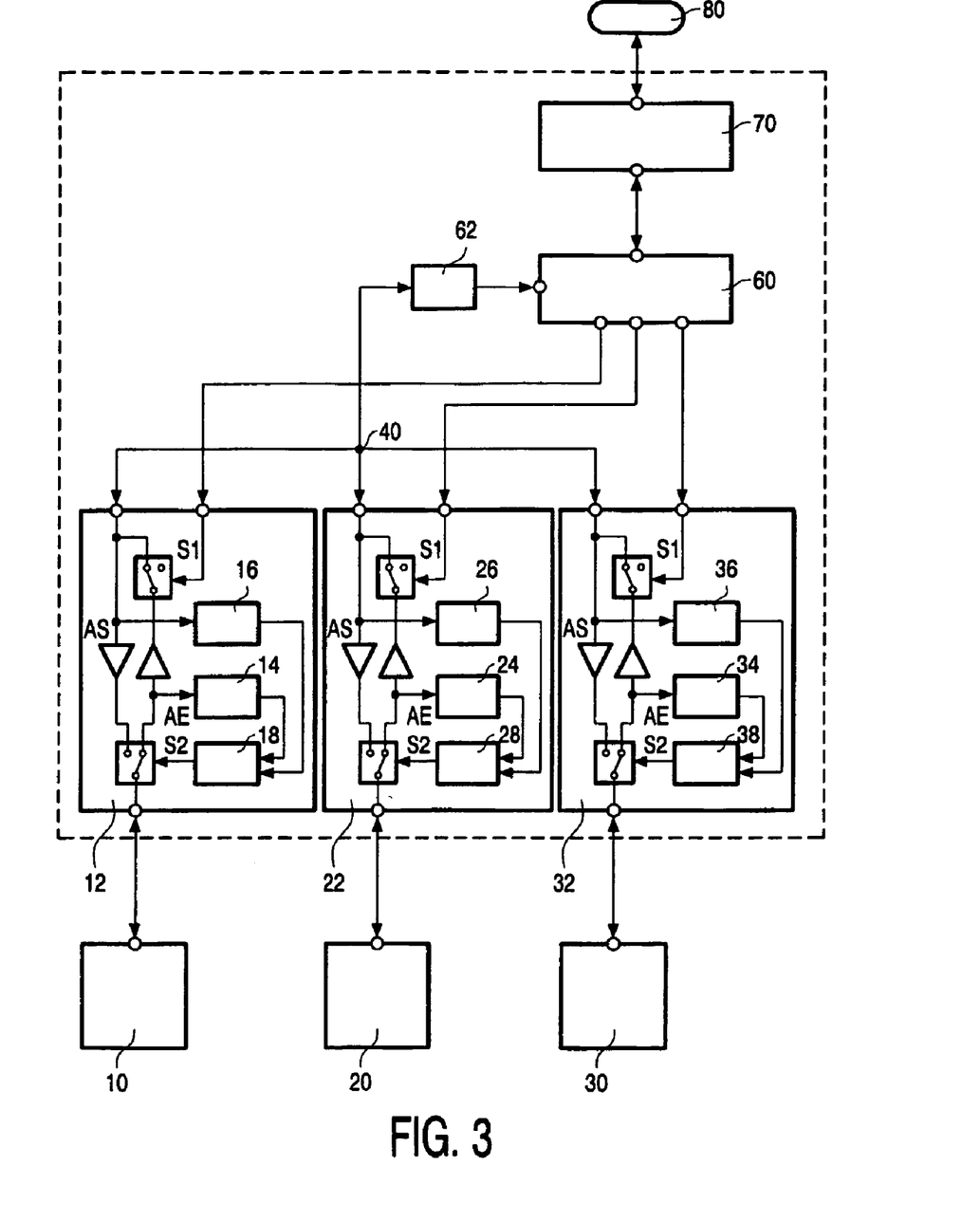
FIG. 3 shows a diagram of a further simplified embodiment with an additional activity detector for the bus monitor.

A further embodiment is shown in FIG. 3. The bus monitor 60 is equipped with its own activity detector 62 for monitoring the activities at the star point 40. As opposed to the circuit configurations shown in FIG. 1 and FIG. 2, only the information concerning the instant of a change of state is available here. The allocation of an activity to an interface cannot be recognized by the bus monitor 60. However, the method according to the invention can now also be realized with bus drivers which do not make available any activity signal.

With the aid of the signals from the activity detectors, the bus monitor 60 receives information concerning the currently observed state "active" or "inactive" at the data inputs of the star coupler. It can determine therefrom the instants for the state transitions and hence the instants and the duration of the transmitted data packets. In the embodiments as shown in FIG. 1 and FIG. 2, the activity signals from each interface of the nodes 10, 20, 30 are fed to bus monitor 60. It can, therefore, compare both the activities at individual interfaces and all activities jointly with its predefined communication time schedule. This communication time schedule can either be transferred to the bus monitor 60 by host the controller 70 via a communication interface 80 or, if a simplified circuit arrangement is used, can be stored in a read-only memory of the bus monitor 60, for example, a ROM or a FLASH.

Options for the synchronization of the communication cycle will be described with reference to the FIGS. 4 and 5.

Figure 4:
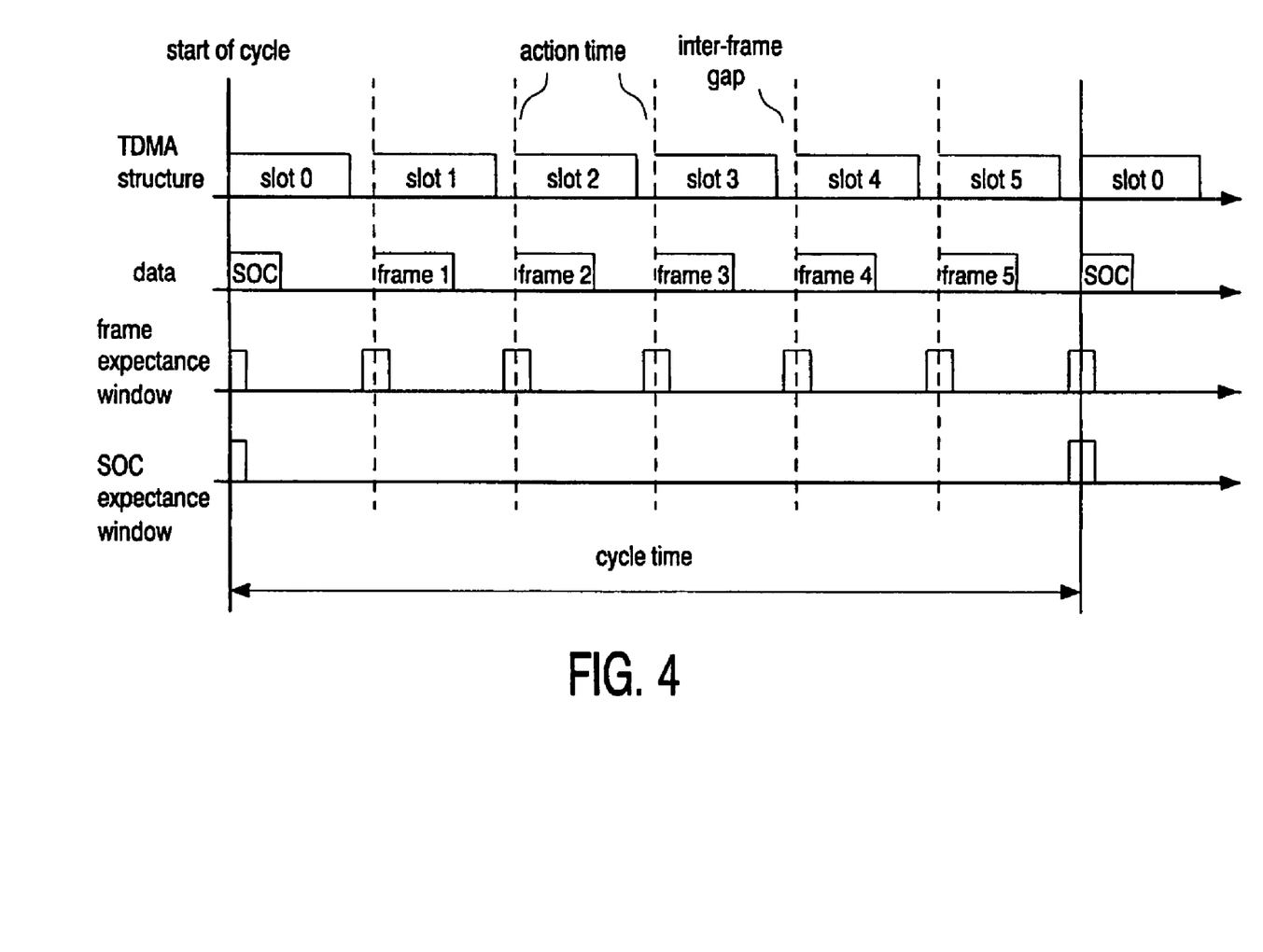
FIG. 4 shows an example of a communication time schedule.

FIG. 4 shows an example of a communication time schedule in which precisely one data packet is provided, the length of which differs from the length of all other data packets. As soon as the bus monitor recognizes this data packet on the basis of its length, it can synchronize its communication time schedule. It is not necessary now to know the allocation of data packets to star interfaces. In the example shown, the duration of the SOC symbol differs from the duration of all other data packets. The SOC symbol is transmitted periodically at the start of the communication cycle. As a result, incorrect synchronization through random glitches can be prevented. To this end, on expiry of a communication cycle, the bus monitor defines a SOC expectation window and does not execute the synchronization of its local clock until the start of an SOC symbol has again been recognized within this window.

Figure 5:
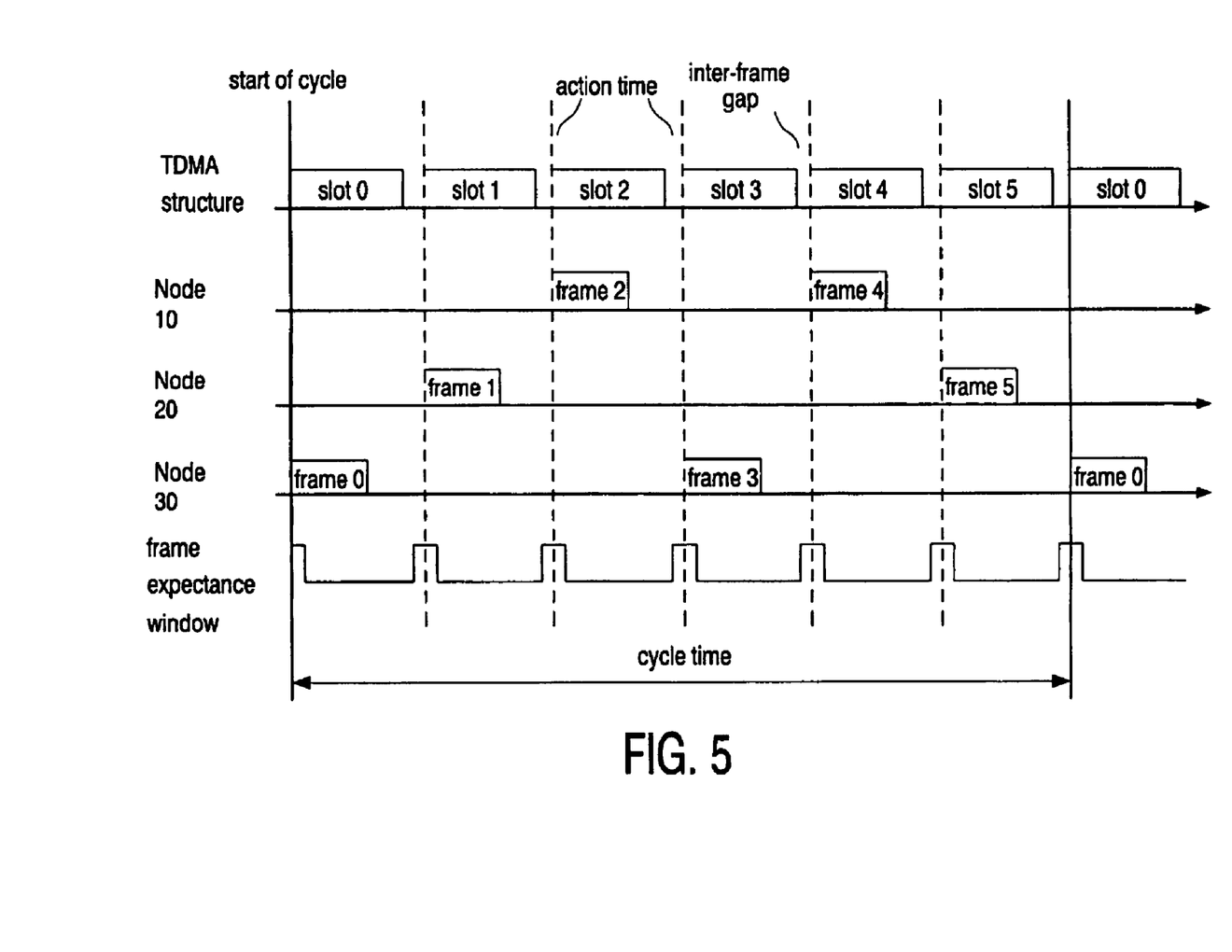
FIG. 5 shows a further example of a communication time schedule.

FIG. 5 shows an example of a communication time schedule which provides a sequence of regular data packets which, including their allocation to star interfaces, occur only once within the time-division multiplex frame. This sequence should be selected such that it cannot be confused with other sequences occurring, not even if one of the data packets belonging to this sequence is missing, thus enabling a synchronization even on failure of a communication node. By way of example, FIG. 5 contains the sequence: frame 2-frame 3-frame 4 for the synchronization.

A combination of the two options described contributes to increasing the reliability of the synchronization.

The bus monitor can store the observed instants of activities on the data lines for the duration of a complete communication cycle and then, in a second step, determine the correct synchronization by comparing or correlating these instants with the communication time schedule.

As soon as the observed activities of the communication nodes coincide unambiguously with the predefined synchronization pattern or synchronization symbol, the bus monitor can synchronize its communication time schedule. Only after this does it execute its actual protection function and, with the aid of the switch S1 in the bus drivers, permits write access by the communication nodes only according to its own communication time schedule.

Should a communication node transmit data outside of the time slots enabled for this communication node according to the bus monitor's communication time schedule, the switch S1 blocks access to the distribution unit. With the aid of the signals from the activity detectors, the bus monitor can recognize such an infringement of the time schedule and report it to the host controller. Depending on the application, the host controller can independently block the access for a communication node with incorrect time behavior, or can report this defect to a higher-level diagnostic unit which then, for example, initiates a reset of the defective communication node.

As already explained above, in addition to the synchronization of the bus monitor with the communication time schedule of the connected communication nodes, it must also be ensured that the local clock of the bus monitor is synchronized with the local clocks of the communication nodes and that these nodes are synchronized with one another.

The invention claimed is:

1. A method for the monitoring and management of data traffic in a communication system with several communication nodes which communicate via interfaces, monitored by a bus monitor, comprising the following steps:
   providing a predefined communication time schedule for all communication nodes,
   initializing the bus monitor,
   synchronizing the communication time schedule of the bus monitor with the predefined communication time schedule executed by the communication nodes in a distributed arrangement, the synchronization taking place on the basis of activities observed at the interfaces,
   monitoring of the activities of the communication nodes by the bus monitor,
   comparing the activities with the predefined communication time schedule, and
   deactivating the interface for a communication node for which an activity not compatible with the predefined communication time schedule has been detected.

2. A method as claimed in claim 1, characterized in that the activities of the communication nodes are monitored at each interface.

3. A method as claimed in claim 1, characterized in that the activities of several communication nodes are monitored centrally.

4. A method as claimed in claim 1, characterized in that the predefined communication time schedule contains a data packet of differing length for identifying an instant in the communication cycle which data packet is used by the bus monitor for the synchronization of the communication time schedule.

5. A method as claimed in claim 1, characterized in that the predefined communication time schedule contains a predetermined sequence of data packets for identifying an instant in the communication cycle, which sequence is used by the bus monitor for the synchronization of the communication time schedule.

6. A method as claimed in claim 1, characterized in that, through observation of the activities of all communication nodes, the bus monitor is continuously synchronized with the global clock time of the communication system.

7. A circuit arrangement for the monitoring and management of data traffic in a communication system with several communication nodes which communicate via interfaces, comprising
   at least one active star coupler with connected communication nodes, there being provided a predefined communication time schedule for all communication nodes, and
   a central bus monitor, which is connected to the active star coupler, after initialization of the bus monitor the communication time schedule of the bus monitor being synchronized with the predefined communication time schedule executed by the communication nodes in a distributed arrangement, which synchronization takes place on the basis of activities observed at the interfaces, which bus monitor monitors the activities of the communication nodes, compares the activities with the predefined communication time schedule, and deactivates the interface for a node for which an activity not compatible with the predefined communication time schedule has been detected.

8. A circuit arrangement as claimed in claim 7, characterized in that each interface is equipped with at least one activity detector.

9. A circuit arrangement as claimed in claim 7, characterized in that an activity detector is allocated to the bus monitor, which activity detector reports the activities at the star point of the active star coupler.

10. A circuit arrangement as claimed in claim 7, characterized in that the bus monitor is combined with the active star coupler to form one unit.

11. The use of at least one circuit arrangement as claimed in claim 8, in a time-controlled communication system with active multiple star topology.

* * * * *